United States Patent
Dabak et al.

(10) Patent No.: US 7,058,114 B2
(45) Date of Patent: Jun. 6, 2006

(54) WIRELESS DEVICE AND METHOD

(75) Inventors: Anand G. Dabak, Plano, TX (US);
Timothy M. Schmidl, Dallas, TX (US);
Mohammed Nafie, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 831 days.

(21) Appl. No.: 09/795,257

(22) Filed: Feb. 26, 2001

(65) Prior Publication Data

US 2001/0022805 A1 Sep. 20, 2001

Related U.S. Application Data

(60) Provisional application No. 60/184,974, filed on Feb. 25, 2000.

(51) Int. Cl.
*H04B 1/713* (2006.01)

(52) U.S. Cl. ............... 375/136; 375/147; 375/261; 375/272; 375/298; 375/303; 375/316; 370/204

(58) Field of Classification Search ............... 375/136, 375/132, 334, 147, 316, 262, 130, 219, 261, 375/222, 233, 272, 298, 303; 370/206, 479, 370/204; 455/445, 447
See application file for complete search history.

(56) References Cited

U.S. PATENT DOCUMENTS

| | | | | |
|---|---|---|---|---|
| 4,532,636 A | * | 7/1985 | Wilkinson | 375/136 |
| 5,394,433 A | * | 2/1995 | Bantz et al. | 375/132 |
| 5,701,332 A | * | 12/1997 | Decrouez | 375/334 |
| 5,812,522 A | * | 9/1998 | Lee et al. | 370/206 |
| 5,812,951 A | * | 9/1998 | Ganesan et al. | 455/445 |
| 5,907,585 A | * | 5/1999 | Suzuki et al. | 375/324 |
| 5,982,819 A | * | 11/1999 | Womack et al. | 375/316 |

* cited by examiner

*Primary Examiner*—Stephen Chin
*Assistant Examiner*—Ted Wang
(74) *Attorney, Agent, or Firm*—Carlton H. Hoel; W. James Brady; Frederick J. Telecky, Jr.

(57) ABSTRACT

A high speed Bluetooth system with switch-to quadrature amplitude modulation allows for simple mobile devices with video data rates in applications such as Internet downloading. Mobile devices may have multiple antennas and adaptive hopping frequencies.

7 Claims, 4 Drawing Sheets

WIRELESS DEVICE AND METHOD

CROSS-REFERENCE TO RELATED APPLICATIONS

This application claims priority from provisional application Ser. No. 60/184,974, filed Feb. 25, 2000. The following patent applications disclose related subject matter: Ser. Nos. 09/634,473 and 09/634,819, both filed Aug. 8, 2000. These referenced applications have a common assignee with the present application.

BACKGROUND OF THE INVENTION

The invention relates to electronic devices, and more particularly to wireless communication.

Demand for wireless information services via cell phones and personal digital assistants (PDAs) is rapidly growing, and techniques and protocols for wireline Internet access have problems such as the delay between requests for web pages. Wireless Application Protocol (WAP) attempts to overcome this web page delay problem by transmitting a group of web pages as a deck of cards with each card corresponding to a page of structured content and navigation specifications. Each WAP card has combined the data to be displayed with formatting instructions used in controlling the display of the data and thus causing larger than necessary data downloads for a fixed display format.

However, there are three constraints that do not allow high speed, content rich Internet surfing using these mobile devices: 1) The cost of downloading large amounts of information on a cellular phone because of the cellular air time expense. 2) Small screen size. 3) Battery power implies low power consumption.

Internet access at most homes is currently limited to 56 kbps over phone lines. One of the applications for Bluetooth™ wireless local area network (LAN) at home is wireless Internet access. The current Bluetooth gross (including overhead) speed of a 1 Mbps channel rate suffices for a 56 kbps wireline (phone line) connection at home providing Internet access for PDA type devices. And the three Internet surfing constraints noted for cellular phones are overcome with wireline to Bluetooth home LAN: there is no air time charge, and the localization to the home allows heavier devices with larger screens and easier battery recharge for higher power consumption.

Notebook computers provide large screens and may have built in 802.11 standard wireless for networking with other computers at 11–22 Mbps, but at high cost.

SUMMARY OF THE INVENTION

The present invention provides a wireless system with a simple mobile device and high speed Bluetooth performance with QAM.

This has advantages including simplified residential Internet access with mobile devices.

DETAILED DESCRIPTION OF THE PREFERRED EMBODIMENTS

Figure 1:
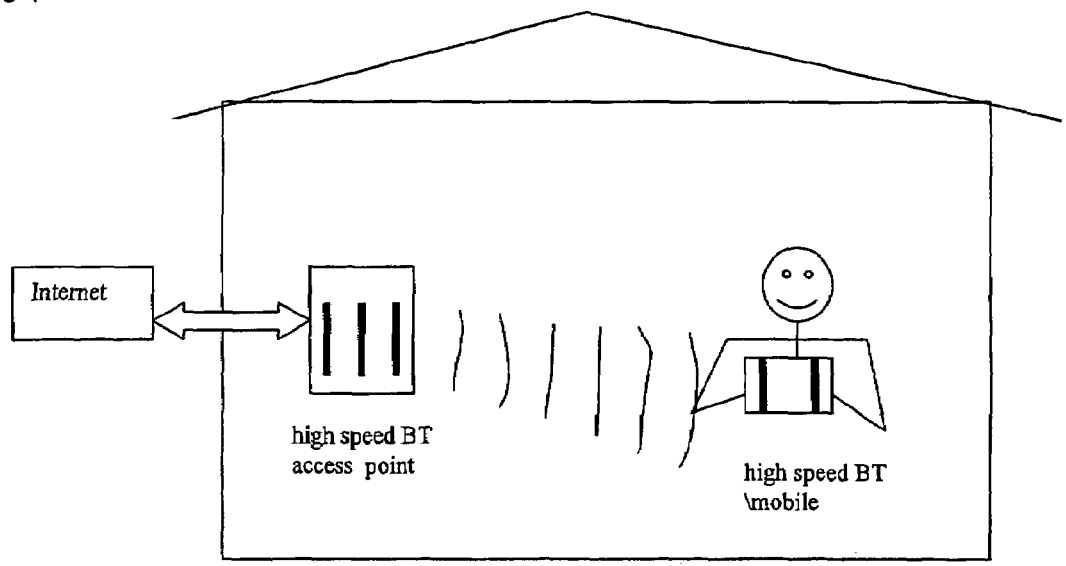
FIG. 1 shows a preferred embodiment system.

Preferred embodiment systems provide simple preferred embodiment high speed Bluetooth mobile devices adapted for Internet use together with a high speed Bluetooth access point having a broad band connection (e.g., cable modem, ADSL) to the Internet. FIG. 1 heuristically illustrates a preferred embodiment system with the mobile device carried about a residence. A high speed (extended) Bluetooth provides a local (10–100 m) wireless connection at data rates of 1–2 Mbps, and ADSL provides similar data rates from the Internet to the high speed Bluetooth access point. Preferred embodiment mobile devices provide minimal cost (e.g., no keyboard) Internet browsing with screen size (e.g., roughly 15 cm by 10 cm) useful at data rates of 1–2 Mbps, such as streaming audio/video.

Standard Bluetooth is a time division duplex system that operates in the unlicensed band at 2.4 GHz. Slow frequency hopping (1600 hops per second) is used to combat interference and multipath fading; typically 79 channels are available (only 23 channels in France and Spain). The gross bit rate is 1 Mbps (maximal asymmetrical bit rate is 723 kbps), and each hop channel has a bandwidth of 1 MHz. Gaussian frequency shift keying (GFSK) modulation is used. Data packets include 1–2 byte payload headers for information about logical channel and payload length. Forward error correction with $2/3$ rate may protect a payload of up to 339 bytes. The link header for a packet has 54 bits and contains control information and active addresses. Each packet typically is transmitted on a different hop frequency (channel).

Figure 2A:
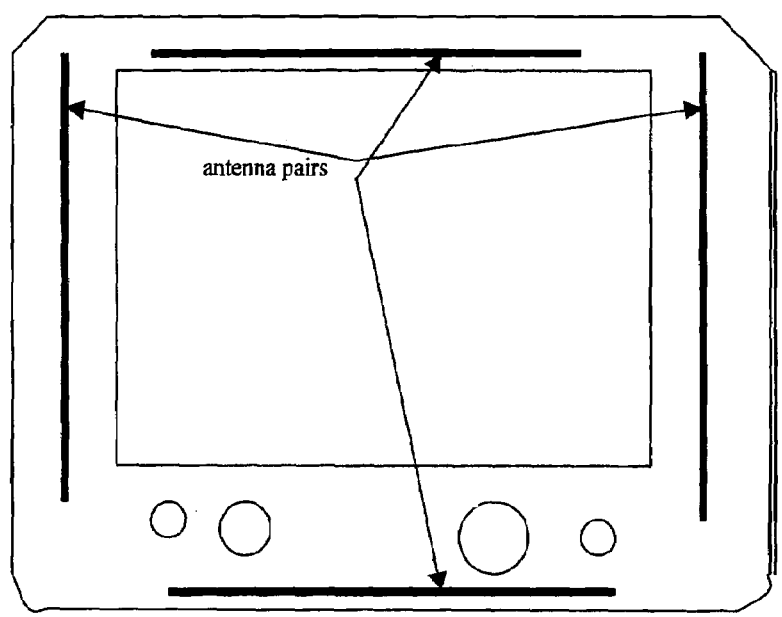
FIGS. 2–3 illustrate a preferred embodiment mobile device.
Figure 3:
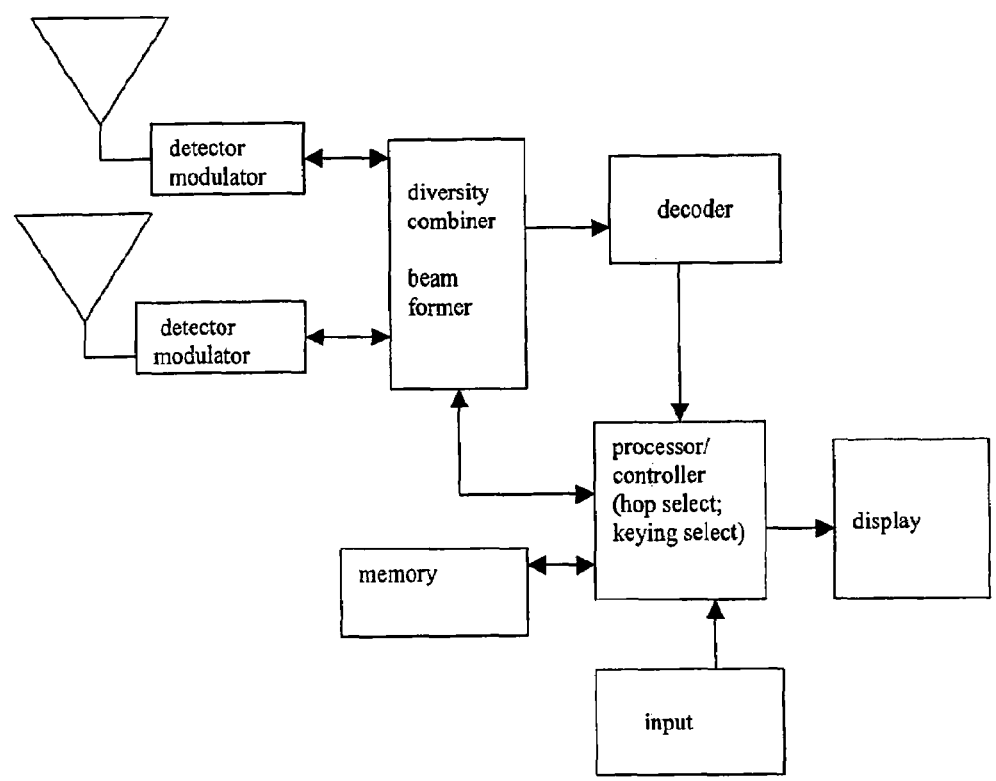

Preferred embodiment devices and systems have the following features to increase net data rate into the 1–2 Mbps range of a high speed Bluetooth:

(1) Multiple antennas on the mobile device and the access point. Multiple diversity antennas at the access point for transmitting and receiving increase the range of Bluetooth even in the presence of ARQ. FIG. 1 heuristically shows three antennas in the access point and a pair of antennas on the mobile device; and FIGS. 2–3 heuristically show the mobile device with a moderate size screen and two orthogonal pairs of antennas; orthogonal pairs of antennas overcomes any polarization of the carrier. The distance between antennas may be up to roughly screen size, such as 15 cm (at 2.4 GHz the carrier wavelength in air is about 12.5 cm). The access point could perform beam forming to increase the signal-to-noise ratio (SNR).

(2) Optimal frequency selection using any of (i) hop extension for slave, (ii) hop extension for master, or (iii) slave frequency selection allows the mobile device to avoid interference and use the good channels for transmission. In particular, (i) hop extension for slave allows the master to instruct the slave to transmit its next packet in the same frequency channel as it transmitted its immediately prior packet. That is, no hop for the slave. Thus a slave hop determiner in the master (i.e., the Internet connection access point) can evaluate the quality of the various hop channels and avoid bad channels by instructions to the slave for transmission in good channels by repetition of channel. Similarly, (ii) hop extension for master allows the slave to instruct the master to transmit its next packet in the same frequency channel as it transmitted its immediately prior packet. So a master hop determiner in the slave can evaluate the quality of the various hop channels and avoid bad channels by instructions to the master for transmission in good channels by repetition of channel. And (iii) slave frequency selection has the slave evaluate the prior N (e.g., N a power of 2) transmissions from the master (on N different channels) and select the channel with the apparently best quality for the slave's next transmission to the master. Conformance with requirements to uniformly use all frequency channels in a frequency hopping system can be met by transmitting more information in good channels than in bad channels while making sure that the transmissions visit all of the frequency channels uniformly.

(3) Employ higher order quadrature amplitude modulation (QAM) constellations which transmit more bits per hertz than the gaussian frequency shift keying (GFSK) scheme as used by Bluetooth. The synchronization word and the packet header will continue to use the GFSK scheme for backward compatibility with Bluetooth. However, once the access point knows that the mobile device it is communicating with is a preferred embodiment type device, then the access point can switch to QAM transmission for the data part of the transmission. With 64 QAM for the data part a channel rate up to 6 Mbps in the 1 MHz channel, and with 16 QAM the data rate is up to 4 Mbps. Indeed, 64 QAM has a constellation of 64 points, so each transmitted symbol represents 6 bits (3 bits by eight in-phase levels and 3 bits by eight quadrature levels). The 64 QAM needs 15 dB more SNR than BPSK transmission to achieve the same bit error rate (BER). However, GFSK itself performs 9 dB better than BPSK; thus 64 QAM needs 6 dB more SNR than GFSK. This 6 dB difference can be made up by foregoing item (1) because two transmit and two receive antennas yield a total of 6 dB gain in power. This analysis assumes perfect channel estimation for the 64 QAM. Channel estimation will still be done using the synchronization word and the packet header. Thus the expected range of the mobile device with the high speed Bluetooth for a given transmission power at the access point is expected to be about the same as normal Bluetooth with the same transmission power.

Figure 4:
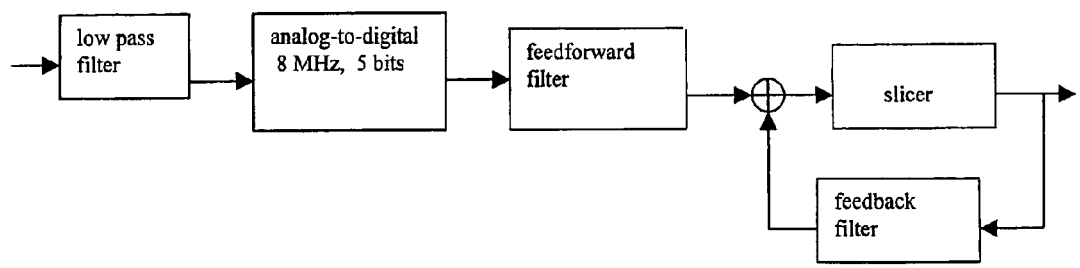
FIG. 4 shows a decision feedback equalizer.

(4) Instead of using a higher order QAM as in (3), high speed Bluetooth can employ high rate frequency shift keying (FSK) from the access point to the mobile device link with a decision feedback equalizer (DFE) at the mobile device. For example, the high rate FSK could transmit 2-FSK modulation at 2 MHz in the 1 MHz channel by introducing deliberate inter symbol interference (ISI) in the channel. This is in a sense an oversampled system as the bandwidth of the channel is only 1 MHz, but this is a nonlinear modulation scheme so the Nyquist criterion does not really apply. The ISI is removed at the mobile device using the DFE shown in FIG. 4. Note that the sampling rate can be varied; e.g., at 48 MHz or 4 MHz. The performance of high rate FSK is expected to be about 10 dB worse than the 64 QAM system described in foregoing (3). However, the advantage of FSK over QAM is that non-linear power amplifier can be used at the access point to reduce its cost and power consumption.

(5) If the requirement of bandwidths of at most 1 MHz for frequency hopping systems is relaxed, then a bandwidth such as 4–5 MHz can also use the foregoing (1)–(4) to achieve higher rates. Indeed, a 5 MHz bandwidth channel with frequency hopping, then using foregoing (3) a 64 QAM modulation will allow a transmission of up to 30 Mbps. Using the foregoing (4) a 20 Mbps signal can be transmitted. These high rates can also be used for either the transmission of live video, CD quality sound. The high rates will also permit multiplexing of a number of users at home communicating to the access point. For example with the 64 QAM system, four users can be supported with each user getting 5 Mbps. Similarly with the high rate FSK, four users with each user getting 4 Mbps can be supported. The multiplexing of the users can either be done using a time division multiple access (TDMA) wherein each user receives the whole bandwidth of 5 MHz for a part of the time and the channel is shared between the users in round robin fashion or on a per request basis. Alternatively, the whole channel of 5 MHz can be shared amongst the users with the multiple access being achieved by spread spectrum code division multiple access (CDMA).

The circuitry performing the high speed Bluetooth with digital signal processors (DSPs) or general purpose programmable processors or application specific circuitry or systems on a chip such as both a DSP and RISC processor on the same chip with the RISC processor controlling. Codebooks would be stored in memory at both the encoder and decoder, and a stored program in an onboard or external ROM, flash EEPROM, or ferroelectric RAM for a DSP or programmable processor could perform the signal processing. Analog-to-digital converters and digital-to-analog converters provide coupling to the real world, and modulators and demodulators (plus antennas for air interfaces) provide coupling for transmission waveforms. The encoded speech can be packetized and transmitted over networks such as the Internet.

6. Modifications

The preferred embodiments may be modified in various ways while retaining the features of QAM with high hopping rate.

For example, the hopping rate may be as low as 200 Hz, the number of antennas on both the access point and the mobile may be varied widely and use beam forming, and so forth.

What is claimed is:

1. A method of wireless communication between a fixed terminal to a mobile terminal, comprising:
   (a) transmitting signals with a carrier frequency hopping rate of at least 200 Hz; and
   (c) wherein initial communication from a fixed terminal to a mobile terminal is with a frequency shift keying of said carrier; and
   (d) in response to communication from said mobile terminal to said fixed terminal, said fixed terminal selects modulation between communication with a quadrature amplitude modulation and said frequency shift keying.

2. The method of claim 1, wherein:
   (a) said mobile terminal receives said signals with a plurality of antennas.

3. The method of claim 1, wherein:
   (a) said frequency hopping is in a pattern selected by the mobile terminal in response to estimated quality of a plurality of frequency channels.

4. The method of claim 1, wherein:
   (a) said frequency hopping is in a pattern selected by the fixed terminal in response to estimated qualities of a plurality of frequency channels.

5. A wireless communication system with a fixed terminal and a mobile terminal, comprising:
   (a) a fixed terminal with a transmitter using a carrier frequency hopping rate of at least 200 Hz; and
   (c) wherein said transmitter is operable for:
      (i) initial communication from said fixed terminal to a mobile terminal is with a frequency shift keying of said carrier; and
      (ii) in response to communication from said mobile terminal to said fixed terminal, said fixed terminal selects modulation between communication with a quadrature amplitude modulation and said frequency shift keying.

6. The system of claim 5, wherein:
   (a) said mobile terminal includes a plurality of antennas.

7. The system of claim 5, wherein:
   (a) said fixed terminal includes a plurality of antennas.

* * * * *